United States Patent Office 3,359,256
Patented Dec. 19, 1967

3,359,256
MONOAZO DYES
Curt Mueller, Basel, and Rudolf Altermatt, Tecknau, Basel-Land, Switzerland, assignors to Sandoz Ltd. (also known as Sandoz A.G.), Basel, Switzerland
No Drawing. Filed Mar. 8, 1965, Ser. No. 438,057
Claims priority, application Japan, Mar. 13, 1964, 3,263/64; Apr. 9, 1964, 4,653/64; Apr. 13, 1964, 4,693/64
9 Claims. (Cl. 260—205)

ABSTRACT OF THE DISCLOSURE

Monoazo dyes of the formula

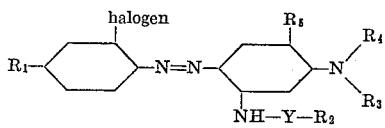

wherein $R_1$ is nitro or methylsulphonyl, $R_2$ is phenyl, alkyl of 1 to 4 carbon atoms, chloroalkyl, methoxyalkyl, ethoxyalkyl or phenoxyalkyl wherein the alkyl of each substituted alkyl contains 1 to 2 carbon atoms, $R_3$ and $R_4$ are each alkyl of 1 to 2 carbon atoms, $R_5$ is hydrogen or alkoxy of 1 to 2 carbon atoms, halogen is chlorine or bromine and Y is —CO—, —COO— or —$SO_2$—, are poorly soluble to insoluble in water and build up excellently from aqueous dispersion on textile materials made of fully synthetic or semi-synthetic hydrophobic high-molecular organic substances. They dye linear aromatic polyesters, secondary cellulose acetate, cellulose triacetate, synthetic polyamides, polyolefins, acrylonitrile polymerization products and polyvinyl compounds. Resulting dyeings are extremely fast to thermofixation, sublimation, pleating, gas fumes, cross-dyeing, dry cleaning, chlorine, water, washing and perspiration.

---

It has been found that valuable monoazo dyes are obtained when an amine of formula

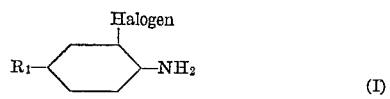

is diazotised and coupled with a compound of formula

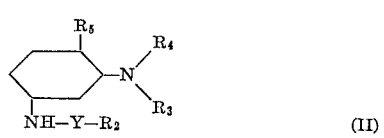

In these formulae $R_1$ stands for the nitro group or an organic sulphonyl radical especially for methylsulphonyl, $R_2$ for a substituted or unsubstituted hydrocarbon radical, $R_3$ and $R_4$ for hydrocarbon radicals, $R_5$ for a hydrogen or halogen atom or an alkyl or alkoxy group, and Y for a —CO—, —COO— or —$SO_2$— group.
The new compounds thus obtained have the formula

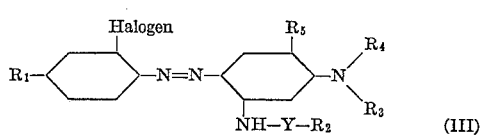

and more specifically the formula

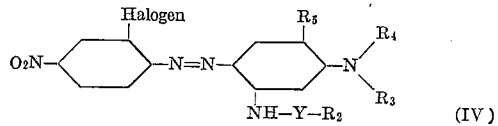

or

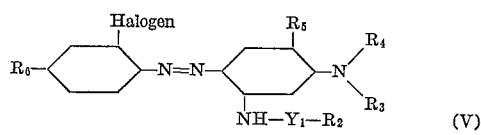

wherein $R_6$ stands for an organic sulphonyl radical, $Y_1$ stands for —CO— or —COO— and $R_2$, $R_3$, $R_4$, $R_5$ and Y have the aforestated meanings. Halogen represents preferably chlorine or bromine; and $R_2$, a phenyl radical, especially phenyl, or an alkyl radical having 1 to 4 (and more particularly 1 or 2) carbon atoms, which can be substituted by, for example, chlorine, bromine, phenoxy or alkoxy, e.g. methoxy or ethoxy. $R_3$ and $R_4$ represent, e.g. alkyl with 1 to 4 carbon atoms and more particularly ethyl, and $R_5$ represents mainly hydrogen or alkoxy with 1 or 2 carbon atoms.

The coupling reaction is generally carried out in an acid, if necessary buffered, medium with cooling, e.g. in the temperature range 0–5° C.

It is of special advantage to convert the resulting dyes into dye preparations before use. For this purpose they are comminuted until the average particle size is approximately 0.01 to 10 microns or more especially about 0.1 to 5 microns. Comminution can be carried out in the presence of dispersing agents and/or fillers. For example, the dried dye is ground with a dispersing agent and if necessary, fillers, or alternatively kneaded in paste form with a dispersing agent, and is subsequently vacuum or jet dried. The resulting preparations, after the addition of more or less water, can be used for dyeing at long or short liquor ratios, and for padding or printing.

For dyeing the dye addition can be about 20 grams to 80 grams per litre; in padding it may be up to 150 grams per litre and in printing up to about 150 grams of dye per kilogram of printing paste. The liquor ratio can vary within wide limits, e.g. 1:3 to 1:200 or preferably 1:3 to 1:80.

The dyes, which are poorly soluble to insoluble in water, build up excellently from aqueous dispersion on textile materials made of fully synthetic or semi-synthetic hydrophobic high-molecular organic substances. They are especially suitable for the dyeing, padding and printing of filaments, fibres, knitted fabrics, and woven or nonwoven fabrics made of linear aromatic polyesters, secondary cellulose acetate, cellulose triacetate, synthetic polyamides, polyolefins, acrylonitrile polymerisation products, or polyvinyl compounds. The dyeings obtained are extremely fast, e.g., to thermofixation, sublimation, pleating, gas fumes, cross dyeing, dry cleaning, chlorine, water, washing, perspiration and other wet tests. The dischargeability and the reserve of natural fibres, especially wool and cotton, is good. As the light fastness is excellent even in pale shades, the dyes are highly suitable for fashion shades. They are stable to boiling alkalis and reduction effects at temperatures up to at least 220° C. and especially at 80–140° C. This stability is not adversely affected either by the liquor ratio or by the presence of dyeing accelerants.

Particularly good is the fastness to light, washing, sea water and thermofixation and the alkaline stability on synthetic polyamide and linear aromatic polyester fibres of the brilliant dyeings given by the dyes of Formula V. Owing to this good alkaline stability, it is possible to dye blends of polyester and cotton fibres with dyes of Formula V and reactive dyes in one bath. The new dyes are also suitable for the production of combination dyeings with yellow and blue dyes of all classes without any reduction in the light fastness. Also the dyes of Formula IV give dyeings and combination dyeings with the aforementioned properties on polyester fibres, e.g., fibres or fabrics of polycondensation products of terephthalic acid and glycols, especially ethylene glycol, which are sold under the names of "Terylene," "Diolen," "Dacron," "Kodel," and other registered trademarks, whereas the aforementioned synthetic polyamides are polycondensation or polymerisation products, e.g. of dicarboxylic acids, usually adipic acid, and diamines, e.g. hexamethylene diamine (nylon 66), of amino carboxylic acids, e.g. ω-amino-undecanoic acid, or of lactams, e.g. ε-caprolactam.

The new dyes are also valuable pigments for the mass coloration of plastics, rubber, natural and synthetic resins and solutions of these materials, and they can also be used for printing, films, plastic sheets, textiles of natural fibres, leather and paper. The known dyeing methods are used for the dyes. Polyester fibres can be exhaustion dyed in the presence of carriers at temperatures from about 80° to 325° C. or in the absence of carriers at about 100° to 140° C. under pressure. The dyes can be padded on these fibres from aqueous dispersion or printed with aqueous pastes, and fixed at temperatures between 140° and 230° C., e.g., with the aid of water vapour, contact heat or hot air. In the optimum temperature range 180–200° C. the dyes diffuse rapidly into polyester fibre and do not sublime even when the fibre is exposed to these high temperatures for some length of time. This eliminates inconvenient contamination of the fixing plant by sublimed dye. Secondary cellulose acetate is dyed preferably at temperatures of about 65° to 85° C. and cellulose triacetate at temperatures up to about 115° C. The optimum pH range is 2 to 9 or more especially 4 to 8.

Cellulose triacetate and polyamide fibres, similarly to polyester fibres, can be padded or printed with aqueous dispersions of the new dyes and the paddings or prints fixed at 140° to 210° C. Generally the normal dispersing agents are used, preferably those of the anionic or non-ionic type, or alternatively a mixture of such dispersing agents. Often an addition of about 0.5 gram dispersing agent per litre of the dyebath of padding liquor is sufficient, although larger amounts can be used, e.g. up to about 3 grams per litre. Amounts in excess of 5 grams per litre do not usually offer any further advantage. Examples of known anionic dispersing agents which can be chosen for use in the process are the condensation products of naphthalenesulphonic acids and formaldehyde, notably dinaphthylmethane disulphonates, the esters of sulphonated succinic acid, Turkey red oil, the alkali salts of the sulphuric acid esters of fatty alcohols, e.g. sodium lauryl sulphate and sodium cetyl sulphate, sulphite cellulose waste liquor and its salts, soaps, and the alkali metal sulphates of the monoglycerides of fatty acids. Examples of known and especially suitable non-ionic dispersing agents are the addition products of approximately 3–40 moles of ethylene oxide and alkyl phenols, fatty alcohols or fatty amines, and their neutral sulphuric acid esters.

In padding and printing the normal thickening agents are used, e.g. unmodified or modified natural products, such as sodium alginate, British gum, gum arabic, crystal gum, locust bean gum, gum tragacanth, carboxymethyl cellulose, hydroxyethyl cellulose, starches, or synthetic products, such as polyacrylamide or polyvinyl alcohol. In the following examples the parts and percentages are by weight and the temperatures in degrees centigrade.

*Example 1*

6.9 parts of sodium nitrite are added at 60–70° with vigorous stirring to 150 parts of concentrated sulphuric acid. Stirring is continued for 10 minutes at 60°, then after cooling to 10° 17.2 parts of 1-amino-2-chloro-4-nitrobenzene are added. After a further 3 hours stirring the sulfuric acid diazonium salt solution is run into a mixture of 800 parts of ice, 200 parts of water and 10 parts of aminosulphonic acid. The resulting solution is filtered at 0° and 25.4 parts 1-(2'-chloropropionyl)-amino-3-N,N-diethylaminobenzene are added. The coupling reaction is brought to an end in acid medium. The dye obtained is filtered off, washed free of acid and dried, on purification it melts at 168.5–169°. It dyes synthetic fibres in brilliant red shades with excellent fastness properties.

*Example 2*

17.2 parts of 1-amino-2-chloro-4-nitrobenzene are added at room temperature to a mixture of 60 parts of water and 40 parts of concentrated hydrochloric acid. After stirring for 3 hours, the suspension is cooled with 100 parts of ice and diazotised in 2 hours at 0–5° with a solution of 6.9 parts of sodium nitrite in 100 parts of ice. Stirring is continued for a further 15 minutes, 10 parts of aminosulphonic acid are run into the solution and it is then filtered. To the clear diazonium salt solution are added 24.2 parts of 1 - N,N - diethylamino - 3 - methylsulphonyl-aminobenzene and the coupling reaction is brought to an end in acid, if necessary buffered, medium. The dye is filtered off with suction, washed free of acid and dried. On recrystallisation from dioxane it melts at 196–197° and dyes synthetic fibres in brilliant red shades with very good fastness properties.

*Example 3*

6.9 parts of sodium nitrite are slowly added to 120 parts concentrated sulphuric acid with vigorous stirring at 60–70°. After subsequently stirring for 10 minutes at 60° and cooling to 10°, 17.2 parts 1-amino-2-chloro-4-nitrobenzene are added at this temperature and diazotisation completed in 3 hours. The sulphuric acid diazonium salt solution is run into a mixture of 27 parts of 1-(2'-chloroethoxycarbonyl)amino-3 - N,N - diethylaminobenzene, 20 parts of concentrated hydrochloric acid and 15 parts of ice. The coupling reaction is brought to an end in buffered medium on which the precipitated dye is filtered off, washed and dried. The dried dye, when recrystallised from a 15:3 acetone-dioxane mixture, melts at 159°. It dyes synthetic fibres in brilliant red shades with excellent fastness properties.

*Example 4*

6.9 parts of finely divided sodium nitrite are added at 60–70° with vigorous stirring to 150 parts of concentrated sulphuric acid. After a further 10 minutes 20.5 parts of 1-amino-2-chloro-4 - methylsulphonylbenzene are added. Stirring is continued for 1 hour at 60° and is followed by cooling to 0°. The diazonium salt solution thus obtained is run into a mixture of 20.6 parts of 1-acetyl-amino-3-N,N-diethylaminobenzene, 100 parts of glacial acetic acid and 200 parts of ice. The coupling reaction is brought to an end in an acid, if necessary buffered, medium at 0°, from which the resulting dyestuff is filtered off, washed free of acid with water and dried. On recrystallisation from an acetone-benzene mixture, the dye melts at 193°. It dyes synthetic fibres in brilliant orange shades with very good fastness properties.

Similar dyes with equally good properties can be obtained when the following coupling components are used: 1-N,N-diethylamino-3-propionyl-aminobenzene, 1 - (2'-chloropropionyl)-amino - 3 - N,N-diethyl-aminobenzene, 1-N,N-diethyl-amino - 3 - methylsulphonyl-aminobenzene or 1-(2'-chloroethoxy-carbonyl)-amino - 3 - N,N-diethyl-aminobenzene.

The dyes in Table 1 are produced by the operating procedure of Example 1 with a diazotised 1-amino-2-halogen-4-nitrobenzene and a compound of Formula II; the dyes in Table 2, according to the procedure of Example 4 with a diazotised 1-amino-2-halogen-4-methylsulphonylbenzene and a compound of Formula II.

TABLE I

| Example No. | Halogen | R₂ | R₃ | R₄ | R₅ | Y | Shade on Polyester Fibre |
|---|---|---|---|---|---|---|---|
| 5 | Br | —CH₃ | —C₂H₅ | —C₂H₅ | H | —SO₂— | Red. |
| 6 | Br | —C₂H₄Cl | —C₂H₅ | —C₂H₅ | H | —CO— | Red. |
| 7 | Br | —C₂H₄Cl | —C₂H₅ | —C₂H₅ | H | —COO— | Red. |
| 8 | Cl | —CH₂Cl | —C₂H₅ | —C₂H₅ | H | —CO— | Red. |
| 9 | Cl | —C₂H₅ | —C₂H₅ | —C₂H₅ | H | —COO— | Red. |
| 10 | Cl | —CH₂—O—⌬ | —C₂H₅ | —C₂H₅ | H | —COO— | Violet. |
| 11 | Cl | —CH₂OC₂H₅ | —C₂H₅ | —C₂H₅ | H | —CO— | Do. |
| 12 | Cl | ⌬ | —C₂H₅ | —C₂H₅ | H | —CO— | Rubine. |
| 13 | Cl | —CH₃ | —CH₃ | —CH₃ | H | —CO— | Do. |
| 14 | Br | —CH₃ | —CH₃ | —CH₃ | H | —CO— | Do. |
| 15 | Cl | —C₂H₄Cl | —CH₃ | —CH₃ | H | —CO— | Do. |
| 16 | Br | —CH₂Cl | —CH₃ | —CH₃ | H | —CO— | Do. |
| 17 | Cl | —C₂H₅ | —CH₃ | —CH₃ | H | —CO— | Do. |
| 18 | Cl | —C₂H₅ | —CH₃ | —CH₃ | H | —COO— | Red. |
| 19 | Br | —CH₂—O—⌬ | —CH₃ | —CH₃ | H | —CO— | Violet. |
| 20 | Cl | —CH₂OCH₃ | —CH₃ | —CH₃ | H | —CO— | Do. |
| 21 | Br | ⌬ | —CH₃ | —CH₃ | H | —CO— | Rubine. |
| 22 | Cl | —C₂H₄Cl | —CH₃ | —CH₃ | H | —COO— | Do. |

TABLE 2

| Example No. | Halogen | R₂ | R₃ | R₄ | R₅ | Y₁ | Shade on Polyester Fibre |
|---|---|---|---|---|---|---|---|
| 23 | Cl | —CH₃ | —C₂H₅ | —C₂H₅ | —OC₂H₅ | —CO— | Reddish violet. |
| 24 | Cl | —CH₂Cl | —C₂H₅ | —C₂H₅ | H | —CO— | Scarlet. |
| 25 | Cl | —C(CH₃)₃ | —C₂H₅ | —C₂H₅ | H | —CO— | Do. |
| 26 | Cl | ⌬ | —C₂H₅ | —C₂H₅ | H | —CO— | Do. |
| 27 | Cl | —C₂H₅ | —C₂H₅ | —C₂H₅ | H | —COO— | Do. |
| 28 | Cl | —CH₂O—⌬ | —C₂H₅ | —C₂H₅ | H | —CO— | Do. |
| 29 | Cl | —CH₂O—C₂H₅ | —C₂H₅ | —C₂H₅ | H | —CO— | Do. |
| 30 | Br | —CH₃ | —C₂H₅ | —C₂H₅ | H | —CO— | Orange. |
| 31 | Br | —CH₃ | —CH₃ | —CH₃ | —OC₂H₅ | —CO— | Reddish violet. |
| 32 | Cl | —CH₃ | —CH₃ | —CH₃ | —OC₂H₅ | —CO— | Do. |
| 33 | Cl | —CH₂Cl | —CH₃ | —CH₃ | H | —CO— | Scarlet. |
| 34 | Br | —CH₂Cl | —CH₃ | —CH₃ | H | —CO— | Do. |
| 35 | Br | —CH₂Cl | —C₂H₅ | —C₂H₅ | H | —CO— | Do. |
| 36 | Cl | —C₂H₅ | —CH₃ | —CH₃ | H | —CO— | Do. |
| 37 | Br | —C₂H₅ | —CH₃ | —CH₃ | H | —CO— | Do. |
| 38 | Br | —C₂H₅ | —C₂H₅ | —C₂H₅ | H | —CO— | Do. |
| 39 | Cl | —CH₂O—⌬ | —CH₃ | —CH₃ | H | —CO— | Do. |
| 40 | Br | —CH₂—O—⌬ | —C₂H₅ | —C₂H₅ | H | —CO— | Do. |
| 41 | Cl | —C₂H₅ | —CH₃ | —CH₃ | H | —COO— | Do. |
| 42 | Br | —C₂H₅ | —CH₃ | —CH₃ | H | —COO— | Do. |
| 43 | Br | —C₂H₅ | —C₂H₅ | —C₂H₅ | H | —COO— | Do. |
| 44 | Cl | —CH₂O—C₂H | —CH₃ | —CH₃ | H | —CO— | Do. |
| 45 | Br | —CH₂O—CH₃ | —CH₃ | —CH₃ | H | —CO— | Do. |
| 46 | Br | —CH₂O—C₂H₅ | —C₂H₅ | —C₂H₅ | H | —CO— | Do. |

Having thus disclosed the invention what we claim is:

1. Dye of the formula

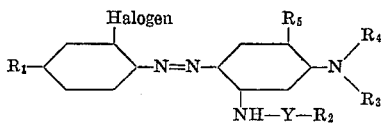

wherein:
$R_1$ is a member selected from the group consisting of nitro and methylsulphonyl;
$R_2$ is a member selected from the group consisting of phenyl, unsubstituted alkyl having 1 to 4 carbon atoms, chloroalkyl radicals, methoxy alkyl radicals, ethoxy alkyl radicals and phenoxy alkyl radicals, the alkyl of each substituted alkyl radical having 1 to 2 carbon atoms;
$R_3$ and $R_4$ are alkyl having 1 to 2 carbon atoms;
$R_5$ is a member selected from the group consisting of hydrogen and alkoxy radicals having 1 to 2 carbon atoms;

Halogen is a member selected from the group consisting of chlorine and bromine; and Y is a member selected from the group consisting of —CO—, —COO— and —SO$_2$—.

2. A dye according to claim 1 wherein the bridging member is —COO—.

3. A dye according to claim 1 wherein the bridging member is —SO$_2$—.

4. A dye according to claim 1 wherein the bridging member is —CO—.

5. A dye according to claim 4 wherein R$_1$ is methylsulfonyl.

6. Dye of the formula

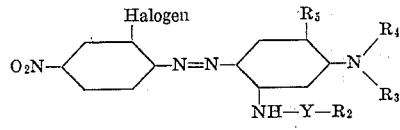

wherein:

R$_2$ is a member selected from the group consisting of phenyl, unsubstituted alkyl having 1 to 4 carbon atoms, chloroalkyl radicals, methoxy alkyl radicals, ethoxy alkyl radicals and phenoxy alkyl radicals, the alkyl of each substituted alkyl radical having 1 to 2 carbon atoms;

R$_3$ and R$_4$ are alkyl having 1 to 2 carbon atoms;

R$_5$ is a member selected from the group consisting of hydrogen and alkoxy radicals having 1 to 2 carbon atoms;

Halogen is a member selected from the group consisting of chlorine and bromine; and Y is a member selected from the group consisting of —CO—, —COO— and —SO$_2$—.

7. Dye of the formula

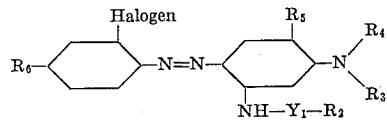

wherein:

R$_6$ is methylsulphonyl;

R$_2$ is a member selected from the group consisting of phenyl, unsubstituted alkyl having 1 to 4 carbon atoms, chloroalkyl radicals, methoxy alkyl radicals, ethoxy alkyl radicals and phenoxy alkyl radicals, the alkyl of each substituted alkyl radical having 1 to 2 carbon atoms;

R$_3$ and R$_4$ are alkyl having 1 to 2 carbon atoms;

R$_5$ is a member selected from the group consisting of hydrogen and alkoxy radicals having 1 to 2 carbon atoms;

Halogen is a member selected from the group consisting of chlorine and bromine; and Y$_1$ is a member selected from the group consisting of —CO— and —COO—.

8. The dye of the formula

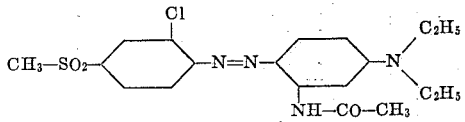

9. The dye of the formula

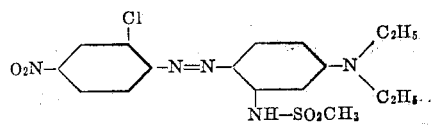

References Cited

UNITED STATES PATENTS

| | | | |
|---|---|---|---|
| 2,083,308 | 6/1937 | Senn | 260—207 |
| 2,151,857 | 3/1939 | Manz et al. | 260—205 |
| 2,231,021 | 2/1941 | McNally et al. | 260—205 |
| 2,289,349 | 7/1942 | Dickey et al. | 260—207 |
| 3,139,422 | 6/1964 | Booth et al. | 260—205 X |

FLOYD D. HIGEL, *Primary Examiner.*

UNITED STATES PATENT OFFICE
CERTIFICATE OF CORRECTION

Patent No. 3,359,256            December 19, 1967

Curt Mueller et al.

It is hereby certified that error appears in the above numbered patent requiring correction and that the said Letters Patent should read as corrected below.

In the heading to the printed specification, line 7, for "Japan" read -- Switzerland --; column 3, line 24, for "325" read -- 125 --; columns 5 and 6, TABLE 2, third column, line 22 thereof, for "-$CH_2O-C_2H$" read -- -$CH_2O-C_2H_5$ --; column 7, lines 5 and 6, 7 and 8, and lines 9 and 10, for "the bridging member", each occurrence, read -- Y --.

Signed and sealed this 18th day of February 1969.

(SEAL)
Attest:

Edward M. Fletcher, Jr.            EDWARD J. BRENNER
Attesting Officer            Commissioner of Patents